Jan. 21, 1936.  L. E-W. MONTROSE-OSTER  2,028,683
MULTIPLE UNIT CONTROL SYSTEM
Filed Dec. 15, 1930  7 Sheets-Sheet 1

FIG. 1.

Inventor:
Louis Eugene-Widolt Montrose-Oster
by C. P. Goepel
Atty.

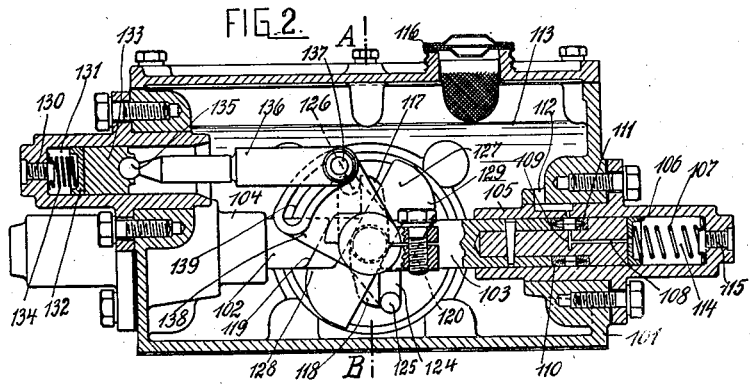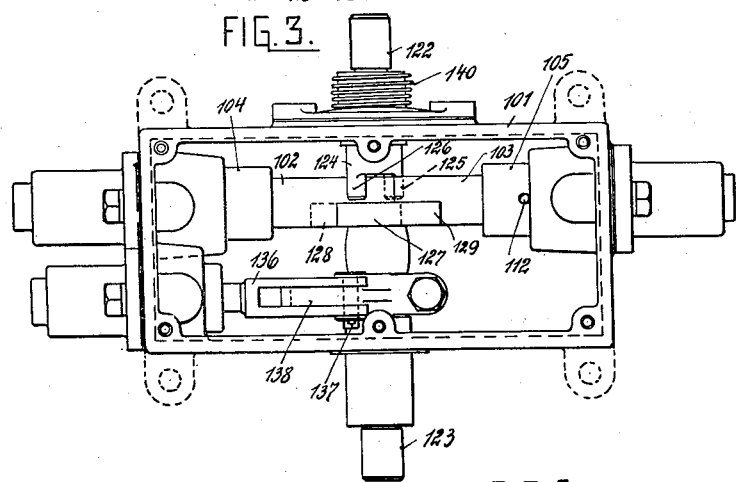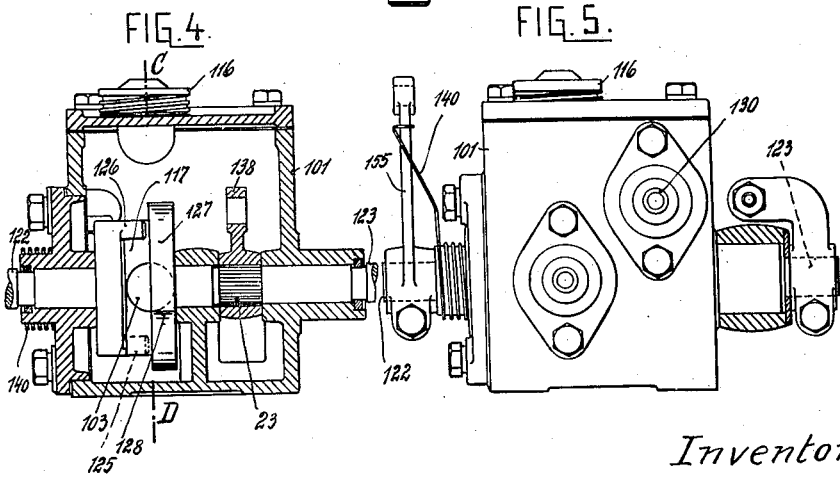

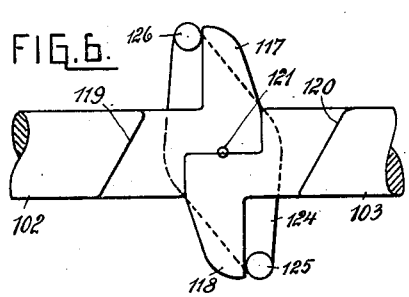
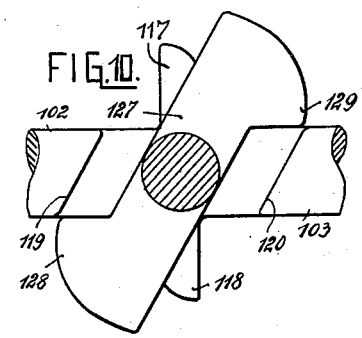
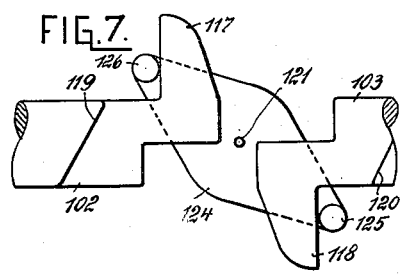
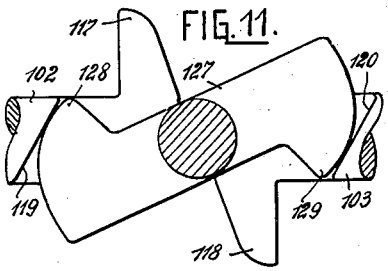
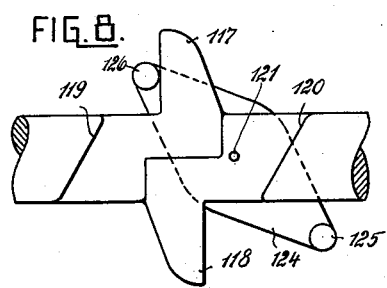
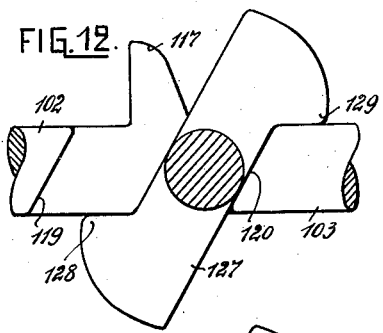
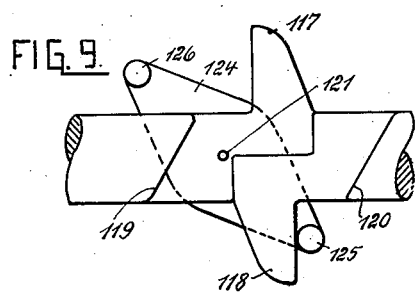
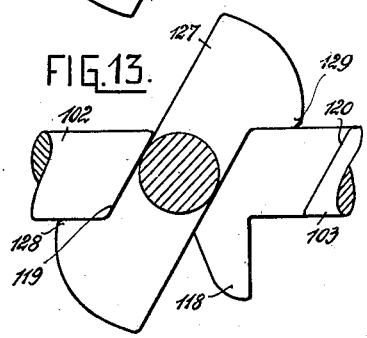
Inventor:
Louis Eugene-Widolt Montrose-Oster
by CP Goepel
Atty Jan. 21, 1936.    L. E-W. MONTROSE-OSTER    2,028,683
MULTIPLE UNIT CONTROL SYSTEM
Filed Dec. 15, 1930    7 Sheets-Sheet 6

FIG.16.

Inventor:
Louis Eugene-Widolt Montrose-Oster
by [signature]
Atty.

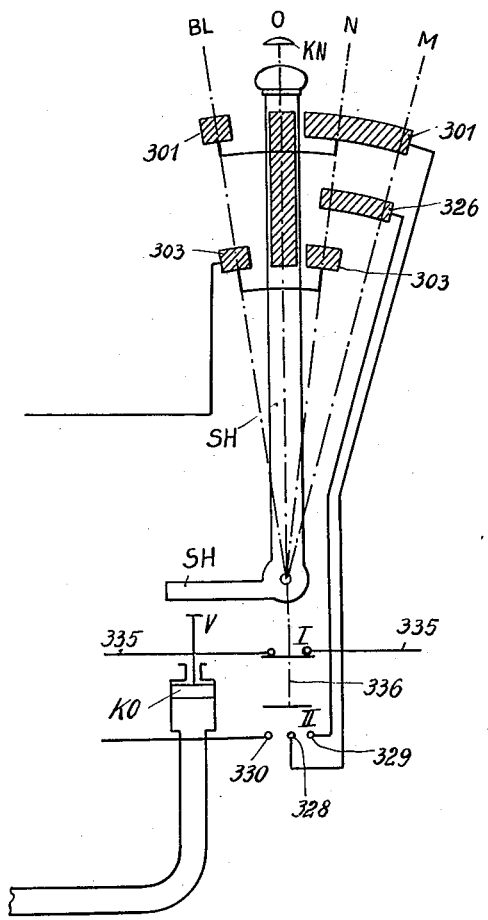

Patented Jan. 21, 1936

2,028,683

UNITED STATES PATENT OFFICE 2,028,683

MULTIPLE UNIT CONTROL SYSTEM

Louis Eugène-Widolt Montrose-Oster, Karlsbad, Czechoslovakia

Application December 15, 1930, Serial No. 502,535
In Germany December 16, 1929

23 Claims. (Cl. 188—153)

This invention relates to an automatic control system for electrically operated vehicles for individual and group drive, preferably in connection with street railway cars, and in addition to this, also in connection with trolley-busses, travelling cranes and the like. My new system of control may preferably be used in connection with systems including a plurality of main controllers and brake controllers operated from a central point such as is the case with trains of different length, that is trains having a greater or smaller number of motor cars. Operation of such trains has heretofore only been possible by means of a control system using relays or air pressure operated individual control systems—in which case numerous control conductors must be carried throughout the length of the train.

The operating organ used in individual control systems may either be loosely connected with the controller-drum such as by means of a releasable clutch operated by a retracting spring, or said operating organ in case of being fixedly connected with the controller-drum must be adapted for forward and backward travel. Besides, an inherent feature of an arrangement of this kind consists therein that the greatest velocity of switching is determined by the greatest speed of rotation of the drum. Stopping of the control apparatus takes place by interrupting the supply of energy to the driving organ for the controller.

All these drawbacks are successfully avoided by my invention. My new system of control makes use of a driving organ which is fixedly connected with the shaft of the control apparatus which rotates in only one direction. Stopping of the control apparatus is effected by locking the same, without, however, interrupting the supply of energy to the driving organ, while on the other hand the greatest speed of rotation may be a multiple of the greatest velocity of switching, so that practically the control apparatus at the moment of being switched out of circuit will again be ready for being switched into circuit.

By my present invention, in particular, the problem is solved to commonly switch into and out of circuit any desired number of motor vehicles from a single operator's stand, by means of a single or only two control wires passing through the cars of a train, the forward motion of the main controller for each car being accomplished automatically in accordance with its temporary ability of receiving current. The mode of the interior connections of each motor car and therewith the number of contacts of the several main controllers, as well as the number and size of the motors in the several cars are entirely immaterial. According to my invention, therefore, quite different cars may be operated together, the only condition for such operation being that all cars are equipped with like automatic control systems, so that every individual motor car may take the energy required from the overhead line by way of its own trolley. If it is desired to use simultaneously with this system of control an electrical system of braking, an oil pressure conduit is provided similar to that usually found in trains drawn by a tractor. The operator's stand may be arranged at any desired place on the train, for instance, on the front platform of a trailer so that motor car and trailer need no more switching at the terminal of a line.

In view of the continuously increasing sizes of the motors and the fixed greatest height of the cars the main controller, the several contacts and the magnetic blow-out devices heretofore could be sufficiently dimensioned only with difficulty in systems of control in order to provide possibilities for proper operation. In contra-distinction to this, my new automatic control system also consists of a plurality of individual parts which may be arranged separately from each other yet requiring no greater space than that heretofore necessary for control apparatus. These individual parts, for instance, may be mounted upon the top of a car, below the floor of a car, below the seats or also at the places ordinarily used for this purpose or at any other places where this apparatus may be suitably mounted. In any case by my invention it will not be necessary that the new automatic control apparatus be positioned within the range of action of the operator.

My new control apparatus is never used for switching the motors out of circuit, but solely for switching the motors into circuit. This principle is based upon the consideration that safety of operation as well as the lifetime of the controllers may be considerably increased and that the amount of structural material necessary for the control apparatus will be decreased if sparks, and in consequence thereof blow-out devices, are avoided at the contacts of the control apparatus. In my new system of control, accordingly, all operations of breaking the circuit during travel are effected by means of a controller-drum which is equipped with a main relay as well as with all contacts which had heretofore been necessary for a reversing drum with maltese cross drive, and with contacts for the shunt steps.

My new system of control operates without further auxiliaries, such as a pressure air conduit, storage batteries and also dispenses with the immediate use of the trolley voltage and any manual operations. In addition to these features my new system of control together with all auxiliary apparatus may be structurally combined with any of the usual types of controllers with only small changes in a very simple manner.

In every case by the new system of control there will be the important advantage that the brake controller may be closed in any desired operating position of the main controller without loss of time and without waiting until the main controller has moved into zero position. In like manner my new system of control permits immediate closing of the main controller in any desired position of the brake controller.

The present application is directed particularly to the fluid pressure brake control features of my invention and the manner in which the mechanical wheel brakes of vehicles equipped with my system of electric braking when interconnected to form a train of several units, may be controlled individually or collectively from any one of the vehicles.

Another feature of my invention covered by the present application is the manner in which the circuits through the main controller to the driving motors of the several vehicles are connected through the brake controller so that the latter must be in zero position in order to feed current to the driving motor beyond a predetermined advanced position of the main controller.

Other features covered by the present application are the details and arrangements of the hydraulic system employed for developing and transmitting actuating forces to the brake controllers, and these and other features will be more fully described in the following specification and illustrated in the accompanying drawings, wherein:

Fig. 1 is a diagram of connections showing the basic principles of my present invention, Fig. 2 is a longitudinal middle section on line C—D of Fig. 4 of the hydraulically operated multiple unit control system for the brake controller;

Fig. 3 shows a plan view of Fig. 2 with the cover removed;

Fig. 4 shows a vertical section of the apparatus in the same height of the axis of rotation along A—B of Fig. 2;

Fig. 5 shows a view of the closed apparatus;

Fig. 6 shows the extensions of the two pistons of the apparatus shown in Figs. 1 to 4, in middle or zero position, with the cradle in contact with said pistons;

Fig. 7 shows the cradle in turned position upon separation of the two pistons;

Fig. 8 shows a cradle with only the left piston moved;

Fig. 9 shows the cradle with the right piston;

Figs. 10 to 13 show the position of the butterfly unit corresponding to the positions of the cradle in Figs. 6 to 9 inclusive;

Fig. 16 is a schematic diagram of connections showing the complete brake operating mechanism as well as a modified form of manual control means; and Fig. 17 is an enlarged detailed view showing diagrammatically a modified arrangement of manual control combining the hand controls and foot operated brake servo-mechanism of Fig. 16 in a single unit.

Figure 14:
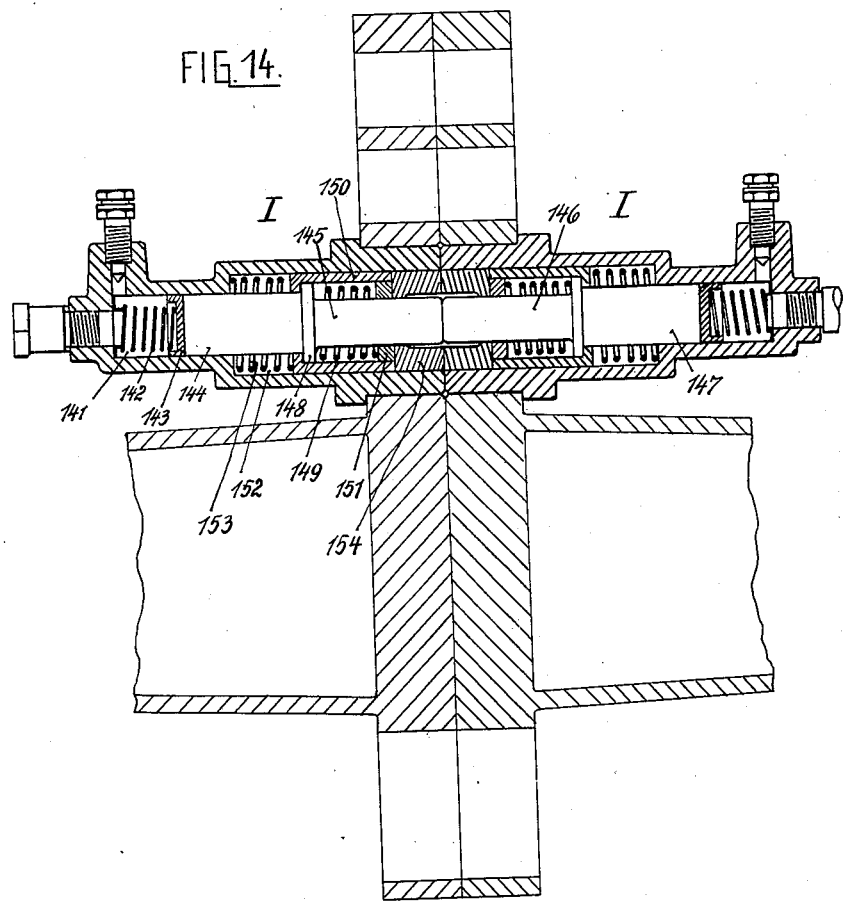
Fig. 14 is a vertical section showing the coupling of the hydraulic device of two cars when coupled together and built in the coupling head.

The main features of my invention are represented in the diagram of connections shown in Fig. 1 which represents the application of the general principles of my invention to a street car having four motors and being equipped with an electric short-circuit brake. According to Fig. 1 furthermore the brake controller is locked in a special manner against the main controller.

In Fig. 1 A designates a driving mechanism, such as for instance a spring-operated clockwork which is wound-up in well known manner by an electric motor, the details of which form no part of the invention as covered by this application. The main controller B is directly operated by said clockwork, while the relay system C for governing the operation of the main controller is mounted upon a common axle with the latter. D is a main switch comprising a main relay and contacts destined to act in the manner of the formerly employed reversing drum. E represents the brake controller F and F' the specially constructed reversing switches at the front and rear operator's stand. G designates diagrammatically the hydraulic multiple unit control system for operating the brake controller shown more fully in Figs. 2 to 14 inclusive.

Main controller B

The main controller B does not principally differ from main controllers of known construction, with the exception that it is provided with the contacts for travel which contacts are distributed over 360° on the controller drum. Besides, the drum of the main controller B is provided with auxiliary contacts or segments 18 which, as more fully explained below, are intended to prevent the entire system against being put under tension in case the main switch D is not in proper position.

The relay C automatically governs the speed of advance of the controller B in the usual manner.

Main switch D

The main switch consists of a drum which during operation may assume two positions and in exceptional cases also a third position. This drum carries in addition to a main relay destined to connect or disconnect the entire system to and from the overhead line all contacts which in ordinary main controllers (for travel) are mounted upon the so-called reversing drum, that is all contacts which at a time are inserted between zero position and the first travel position, or as the case may be between zero position and the first brake position. The arrangement is so made that only for purposes of supervision the zero position as shown may be assumed by the reversing controller solely by actuating said controller by hand. During normal operation, however, the controller D is either in the position "Ru" (travel) or in the position "Br" (braking). The controller D is ordinarily kept, when inoperative, in the position "Br" by means of the spring 12.

Brake controller E

The brake controller E of Fig. 1 is operated in the present case by means of oil pressure developed in the hydraulic brake control system G in a manner to be hereinafter fully described. Ordinarily the brake controller E is kept in zero position by the retracting spring 73. From the drawings it may be seen that in switched-in condition of the main controller, the coils 74 and 75 will likewise be inserted into circuit causing the release of the locking pawl 77. If, therefore, the brake pedals 78 or 78' are actuated, the spring-weighted piston 79 will be moved forward and the part 80 which is immediately connected with said piston may be immediately rotated, that is the brake switch proper with its saw-shaped locking pawl 81 will remain in zero position. Upon de-energizing the coils 74 and 75, the coupling bolt 76 as well as the locking pawl 77 will come into engaging condition and the piston 79 may move forward and carry with it the brake controller and the ratchet wheel 81. The saw-shaped conformation of the ratchet wheel prevents return motion of the switch and therewith any formation of sparks. The oil piston may now be immediately retracted and in like manner the switch, if it had for instance not remained in its end position, may be further moved forward as far as into its end position by proper forward motion of the oil piston. At the moment of again energizing the coils 74 and 75, the coupling bolt 76 and the locking pawl 77 may be released permitting the switch to return almost instantaneously into zero position by action of the retracting spring 73, it being immaterial in this case at which point the connecting disk 80 which is driven by oil pressure is positioned at this moment. The segments and steps used according to my invention are exactly in agreement with the segments and steps used in a switch of most simple construction. There is solely used a locking contact 82 which affords security against rotation of the main controller beyond the first switching steps only, in case the brake switch had returned in the meantime into its zero position.

This brake switch, for the purpose of servomotor control, may also be equipped in accordance with further improvements described further below.

Travel reversing switches F and F'

F and F' represent the travel reversing switches mounted at the front and rear operator's stand. These switches, while possessing certain novel structural features, do not form an essential part of my brake control system and are therefore indicated only diagrammatically.

Hydraulic multiple unit control G

Simultaneous and uniform actuation of several brake controllers in a train can only be effected by means of a multiple unit control system. A well-known example of such multiple unit control systems comprises relays ordinarily in connection with electrically operated cars preferably city, underground, and overground railways. While the relays which operate the several steps for travel may be immediately actuated from the line-voltage, this is not permissible in connection with electrical systems of braking, because the brakes in this case would be dependent upon the presence of the line voltage, while in the absence of the line voltage such brake systems would not operate. In the heretofore multiple unit control systems, therefore, the possibility of electrical braking has not been utilized and in most cases pressure air brakes had been provided for braking. There are also cases in which electrical braking had also been effected by electrically operated relays. In this case, however, an independent source of electric current, for instance a storage battery, had been necessary in the several motor cars of the trains.

In case of street railway cars up to the present, the employment of multiple unit control systems and therewith the possibility of composing a train from any desired number of motor cars would in most cases not be utilized for the aforementioned reasons. On the one hand, it had not been found advisable to resort to the independent pressure air operated brake and on the other hand storage batteries could not be employed for want of space or in view of an undue increase of the weight of the cars.

My present invention, in contra-distinction to known electrically operated multiple unit control systems, employs a liquid control agent and will thus be independent from the presence of electrical energy, possessing in spite of this the following main features of a multiple unit control system: Firstly, any desired number of like constructed units may immediately be connected with each other and adapted for multiple unit control, secondly, there may be provided any desired places of control, thirdly control may be effected at any time from a single place of control, while all other places of control are locked in this case, fourthly, all units may be connected in either direction with each other and the same operation of control will take place in like sequence and at like times, independently of the place from which the operations of control are initiated.

Every unit equipped with this hydraulic multiple unit control system comprises a set H of control apparatus as well as one half of a coupling I shown in Fig. 14 provided at either end of said set. Any desired number of further units may be connected to said one half of a coupling, a like half of a coupling being used for connecting further units therewith.

Control apparatus H

The set of control apparatus H consists of a casing 101 in which there are mounted two pistons 102 and 103 of special conformation, said pistons being guided on either end by members 104 and 105. At its outer end every piston is equipped with a rubber packing 106 which is kept compressed by a spring 107. This packing as well as the pistons are provided with a central bore 108 with a radially directed extension 109 reaching as far as into the cylindrical and properly cut-away rubber cuff 110. This rubber cuff in position of rest of the pistons leaves a bore 111—112 in the wall of the body 105 in open condition, so that the oil 113 which fills-up the entire set of control apparatus may be connected with the piston space 114 and the pipe conduit 115. The piston 102 and the guide 104 are arranged accordingly. The casing is equipped with a cover including a filter 115 through which oil may be subsequently filled into the set of control apparatus. The two pistons 103 and 104 carry on their left-hand side, as seen from the rear (Fig. 7) two pawls 117 and 118 which are unsymmetrically arranged within a plane C—E positioned in the direction of the pistons, one of said pawls, 117, being directed towards above and the other of said pawls, 118, towards below as shown in Fig. 2. On the right-hand side of the central plane passing through the longitudinal axis of the set of control apparatus, the pistons as shown in the drawings are not extending to the center. Oblique surfaces 119 and 120, as shown in Fig. 10, represent the end surfaces of the cylindrical part of the two pistons.

As shown in Fig. 4 and 5 two shafts or studs extend from the casing 101, one shaft 122 serving for the reception of energy and the shaft 123 for the supply of energy to said former shaft. The shafts 122 and 123 are mounted perpendicularly to the two pistons and in such a manner that their central axis passes exactly through the imaginary central point of contact 121 of the two pistons. The shaft 122 carries a cradle 124 with two horizontally directed bolts 125 and 126 (Figs. 2–9), said bolts being of such a length that they do not fully extend to the aforementioned imaginary central plane C—D. This cradle 124 is so arranged that the bolt 126 will be positioned in front of the pawl 117 of the piston 102, while the bolt 125 will be positioned in front of the pawl 118 of the piston 103. On the right-hand side of the set of control apparatus the energy supplying shaft is equipped with a member 127 of the shape of a butterfly having two pawls 128 and 129 which upon rotation of the body 127 in clockwise sense will abut against the surfaces 119 and 120 of the piston 102 and 103, thus moving said pistons away from the center towards the outside (Figs. 10–13).

For each unit there will only be required a single set of control apparatus H. It is, however, a matter of choice to employ a plurality of places of control for each unit. In this case each set of control apparatus must likewise act upon a shaft 123' which actuates the energy supplying shaft. This is accomplished in the present case (Figs. 2–5) also by hydraulic means including a pressure conduit connected to the set of control apparatus at the point 130. The pressure liquid enters the space 131 and causes displacement of the rubber cuff 132 as well as of the piston 133 in a direction towards the right, the spring 134 which keeps the cuff 132 in tensioned condition being now released. By means of a ball-and-socket joint 135 the pressure of the piston is transmitted to the pivot 137 by means of the piston rod 136, said pivot 137 causing the segment 138 carried by the energy supplying shaft 123 to likewise rotate in clockwise direction. The segment 138 is provided with a slot 139 of circular conformation permitting, in case of direct actuation of the shaft 123, the members 132 to 137 to remain at rest. The spring 114 continually tends to rotate the cradle 124 in clockwise direction, therewith carrying back the pistons 102 and 103 after each actuation against their stops and into their central or zero position.

In condition of rest of the set of control apparatus H the two pistons 102 and 103 will abut against each other (Fig. 6). The cradle 124 will be in the position shown, while the butterfly 127 will be in the position shown in Fig. 10 and the pistons of the half I of the coupling will be in their central position as shown in Fig. 14.

The multiple unit control system is actuated by rotating the operating shaft 123 in clockwise direction, for instance by means of a hand-lever, treadle or the like. The body 127 (Figs. 10–13), of butterfly shape, fixedly connected therewith is now likewise rotated in clockwise direction, while the pawl 129 abuts against the oblique surface 120 of the piston 123 and the pawl 128 against the oblique surface 119 of the piston 102, thus moving the pistons 102 and 103 symmetrically in opposite directions while sliding upon said surfaces.

During this symmetrical motion of the pistons 102 and 103 away from each other, the pawl 117 of the piston 102 will carry with it the bolt 126 in one direction, while the pawl 118 of the piston 103 will likewise carry with it the bolt 125 in the other direction, causing thus the cradle 124 to rotate in counter-clockwise direction, this rotation in the present case (Fig. 5) being for instance transmitted to a lever 155. This lever 155 may be used for directly or indirectly initiating any desired operations of control.

Fig. 2 shows the piston 123 in cross-section. After the piston 103 had been displaced by the body 127, that is if the piston 103 shown in Fig. 2 has moved towards the right, the rubber-cuff 110 will at once close up the bore 111 in the casing 105 and thereupon interrupt the connection between the oil in the pipe conduit leading to the aperture 115 and the oil 113 in the interior of the set of control apparatus H. The oil contained in the piston space 114 will now be moved by the rubber cuff 106 through the aperture 115 towards the right into the conduit and come into the one half I of a coupling, for instance the left-hand part I shown in Fig. 14. Now the oil fills up the piston space 141 and during simultaneous expansion of the spring 142 will move the rubber cuff 143 and the piston 144 which accordingly moves towards the right. The piston 144, in case a further piston is symmetrically connected therewith, will now abut with its front part 145 against the symmetrical part 146 of the piston 147 of the coupling is connected therewith. This latter coupling is a structural image of said former coupling. The two couplings therefore will perform the same function in reversed order. The piston 114, upon motion towards the right, will offer by reason of the collar 148 a certain resistance against a spring 149 which serves to carry the piston back into the central position of rest shown in the drawings after a completed working stroke. The piston 144 together with its parts 145 and 146 and with the spring 149 is mounted within a hollow sleeve or piston 150 closed up at its right-hand end by an annular member 151.

The hollow piston 150 may move within the cylindrically shaped part 152 of the half B of the coupling against the action of the spring 153. The drawings show the piston 150 in its position of rest, that is in its outermost right-hand position, this position being defined by the intermediate annular member or ring 154. The arrangement of the just-described system of pistons will automatically force the piston 144 back into its central position as both springs do not act directly against each other. More particularly, the spring 149 will force the piston 144 to assume together with the collar 148, the outermost left-hand position within the hollow piston 150, while the spring 153 will force the hollow piston 150 together with the piston 144 and the parts connected therewith to assume the outermost right-hand position within the cylindrical hollow space 152.

In an analogous way the piston 102 which by motion of the butterfly 127 in clockwise direction will be moved towards the left and displace a quantity of oil and therewith supply another half I of the coupling and the piston forming part of this half will be moved towards the outside in like manner as just described. In consequence of this, every motion of the acting shaft in clockwise direction will effect uniform displacement of the pistons in both halves of the coupling which pistons are normally kept in their central position, and simultaneously therewith motion of the cradle 124 in counter-clockwise direction.

A like motion in counter-clockwise direction will take place in all other units which may eventually be connected in any desired direction with the unit just described.

Figure 15:
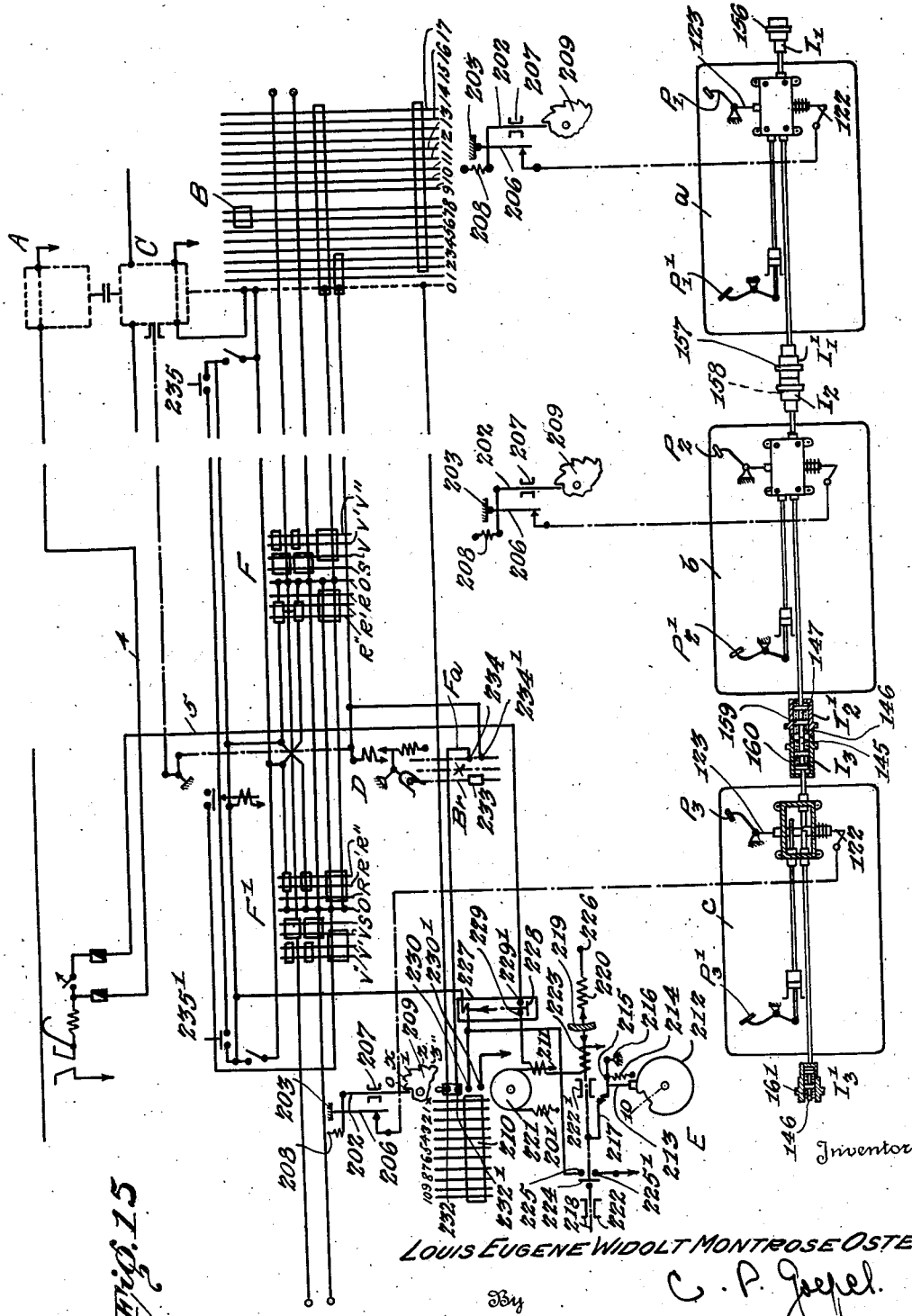
Fig. 15 is a schematic arrangement of the hydraulic system in a train consisting of three cars.

If it is, for instance, desired to operate a train of three cars as shown in Fig. 15 by depressing the pedal P₁ in the unit a, the energy receiving shaft 122 will rotate in counter-clockwise direction, while simultaneously therewith the piston 156 of the half I¹ of the coupling moves towards the right and the piston 157 of the half I¹ towards the left. The piston of the half I¹, when moving towards the left, will now likewise move the piston 158 of the half I² towards the left, that is towards the inside. Now motion of the piston 103 which forms part of the set of control apparatus provided in the car b will take place by the intermediary of the interposed volume of oil. The piston 103 therefore will move towards the left thereby simultaneously moving the piston 102 likewise towards the left. The piston 102 with the pawl 117 thereon will move the bolt 126 on the cradle 124 likewise towards the left so that said cradle will be rotated around its center 121 in counter-clockwise direction, the same as in the case above described, in which the pistons had moved in opposite directions away from their central position. In the case at present described this rotation of the cradle 124 is effected in counter-clockwise direction without the aid of the pawl 118 on the piston 103 and the bolt 125 on the cradle 124.

The piston 102 by reason of the above described displacement of oil now effects motion of the piston 159 forming part of the clutch I² towards the left, that is towards the outside, causing now also the piston 160 which forms part of the coupling I³ to move towards the inside. The steps of operation just described in connection with the car b will now be repeated in the car c. It may further be noted that the piston 161 which forms part of a coupling I³ will likewise be moved towards the outside.

If it is desired to operate the train from the car c instead of from the car a the energy supplying shaft 123 would first have to be actuated, by the pedal P³′ and the intermediary of the interposed oil pressure device instead of by the pedal P³. In this case the same motion takes place as above described with the exception that although the piston 161 of the coupling I¹′ is moved towards the left that is towards the outside, all other pistons forming part of the couplings of the entire train will be moved towards the right. Accordingly, also the pistons 102 and 103 of the sets of control apparatus in the cars b and a will be moved from their central position not towards the left but towards the right (Fig. 9). In this case the pawl 118 on the piston 103 will carry the bolt 125 on the cradle 124 towards the right, while the pawl 117 of the piston 102 and the bolt 126 on the cradle 124 will not come into engagement with each other. In this case also the cradle 124 will again be rotated in counter-clockwise direction.

From Figs. 12 and 13 it may be clearly seen that in the last described cases the pistons 102 and 103 of the sets of control apparatus H move in the same direction irrespective of the fact whether the motion takes place towards the right or towards the left, and actuation of these sets of apparatus by action of their shaft 123 or by action of the butterfly 127 will be impossible. Fig. 13 shows clearly but in the first case the butterfly 127 engages with its pawl 129 the piston 103 causing a blocking of this apparatus, while in the other case the pawl 128 engages with the piston 102 causing likewise a blocking of the apparatus.

Actuation of the multiple unit control system may evidently be accomplished also by the set of control apparatus H of every desired unit, the assumption being that the entire system is in its central position or its position of rest prior to starting the operations of control.

If it is desired to actuate the entire multiple unit control system from the car b (emergency brake) the pistons 102 and 103 in the set of control apparatus H of the car b will be moved apart by action of the butterfly 127 and the volumes of oil will be moved towards the car a in the direction of travel and towards the car c in a direction opposite to the direction of travel, travel of the cars being assumed towards the right of the drawings. In the set of control apparatus H of the car b consequently the pistons 102 and 103 will assume the position shown in Fig. 7, while said pistons in the car a will assume the position shown in Fig. 9, and in the car c the position shown in Fig. 8. The sets of control apparatus in the cars a and c will be blocked at the moment of actuating the multiple unit control system from the car b, while the three cradles 124 of all sets of control apparatus will be actuated exactly at the same time and in a uniform manner like rotations in counter-clockwise direction.

*Mode of operation*

Referring to Fig. 1 the current taken from the overhead conductor 1 by means of the trolley 2 in the usual manner will be divided at the point 3 through the lead 4 to the main controller operating and governing devices A and C and the motor and through the connection 5 towards the auxiliary devices of the automatic control apparatus.

The direction of travel of the car is assumed to be from the left towards the right in the drawings. Upon actuation of the pressure button 6 the current will flow from the overhead conductor past the branching point 8 towards a relay 9 and from this relay to ground. The relay 9 will establish a circuit including the overhead conductor, the lead 10, through the reversing switches F′, F″ and the lead 16 and in case the main controller is in its zero position, into the contact segment 18, into the lead 19 and into the lifting coil 20 forming part of the main controller D and from here to ground. Energization of the lifting coil 20 by means forming no essential part of my brake control apparatus, moves switch D to closed position to effect operation of the main controller actuating and governing devices A and C.

A full and complete description of applicant's improvements in Automatic control system for electrically operated vehicles is set forth in my copending and divisional application Serial No. 723,904, filed May 4, 1934.

Simultaneously with the energization of coil 20, the coils 74 and 75 are put under tension and will release in the aforedescribed manner the brake controller which is carried back into zero position by action of its retracting spring 23. The brake controller must have assumed its zero position before the main controller has passed through a second step of operation. This may be clearly seen from the diagram of connections. As had been explained, the coil 20 will be put under tension by way of the contact segments 18 on the main controller. From the conformation of these segments it follows that the lead 19 can be supplied with current from the lead 16 only for such a length of time until the main controller has come into its second operating position. If the main controller is in condition of changing over from the second operation to the third operation, this connection is interrupted and the coil 20 will be under no tension; that is the main controller will be switched out of circuit, if the brake controller in the meantime had not been moved into its zero position, thereby establishing a circuit including lead 16, uppermost contact segment 18, undermost segment 18, lead 22, locking contacts 82 of the brake switch E, attracted contact member 23 of the main controller, and holding coil 20 of the main switch.

As hereafter stated, the fluid pressure actuating element 79 as shown in Fig. 1 may operate directly on the brake controller E to cause rotation of the same, or said device may control a servo-mechanism G (see Fig. 16) arranged to cause actuation of the brake. When testing the parts which form part of the brake equipment of my present automatic control system, it has been found that sometimes considerable pressures must be exerted upon the pedal which serves for operating the brake and in particular for rotating the drum of the brake controller. This is due to the fact that resistances due to friction, and the resistance offered by the various retracting springs must be overcome. While this is possible without exerting an excessive amount of power for operating the brake pedal for a single controller the actuation of the drums of a plurality of brake controllers in an entire train composed of several motor cars will require a multiple amount of power which can only be difficultly furnished by the foot of the operator. Besides, this arrangement is connected with the drawback that according as to whether the train comprises one or more motor cars the power to be exerted by the foot of the operator upon the brake pedal will be quite different in order to bring about the same effect of braking in one or more cars. With this in mind, a further improvement according to my invention consists in providing an arrangement which avoids direct actuation of the brake-drum by means of pressure oil and uses the pressure oil system solely as a servo-motor.

This improvement is represented in the form of a diagram of connections in Fig. 16 in which the aforementioned parts A—D and F—G are only indicated, while the modified part E is fully represented.

In Fig. 16, 201 designates a spring tending to insert into circuit the controller drum 221 which is merely indicated in Fig. 16. 202 is a part of a locking pawl which may move around the fixed point 203 against the action of a spring 208 by exerting a pressure upon the lever 206 by means of the foot lever 204 or by means of the pressure oil pistons 205, 205'. 207 is a guide which serves for guiding the locking pawl 202 along a straight line of motion. 209 represents a spirally shaped cam-disk with radially arranged steps thereon. 211 is an auxiliary contact member for the controller drum. 223 is a magnet which acts against the spring 201 and, if energized, serves for switching the brake drum out of circuit. 212 is an auxiliary cam-disk mounted upon the controller drum, said auxiliary cam-disk having a proper recess permitting the finger 213 in position 10 of the brake drum to drop into said recess. In this manner the spring 214 will be enabled to draw the pawl 215 downward around the fixed point 216. 217 is a counter-pawl, likewise provided with a spring, said counter-pawl being pivoted to a rod mechanism 218 which may press the brake shoe 219 under the action of the spring 220 against the driving wheels of a car. 222 and 222' are guides for guiding said rod mechanism along a straight line of motion. 323' is an electro-magnet adapted to draw the brake shoe 219 away from the driving wheels of a car, therewith releasing the brake. 224 is a final disconnecting switch which is mounted upon the rod mechanism 218 and serves for connecting or disconnecting the ends 225 and 225' of a conductor leading to ground. The spring 220 is fixed at 226. 227 is a relay which serves to establish connection 319 between 322 and 320 by means of a contact member.

The aforementioned auxiliary contact member 211 on the brake drum serves to establish connection with the ground during contacting of the fingers 230 and 230'. 339 is a short auxiliary contact member on the drum which serves for establishing connection between the fingers 232 and 232' in zero position of the controller. 233 is a further auxiliary contact member on the main switch D drum which in position "travel" serves to establish connection between the contact fingers 234 and 234'.

The diagram of connections shows the brake drum in zero position. As had been above described, the main switch D at the moment when the operator releases the pressure button 301 or 301' will be in braking position, the auxiliary contact member 233 disconnecting the contacts 234 and 234'. If it is desired to effect braking in an electrical way, the operator will have to depress the foot lever 204 thus raising, by the aid of the pressure oil pistons 205—205' and the lever 206, the locking pawl proper 202 to such an extent within its guide 207 that the cam 209 will move one step forward towards the left by action of the tension spring 201. Further depression of the foot lever now causes the cam 209 to move another step forward until finally the braking position 10 on member 311 is reached. At this moment the finger 213 drops by action of the spring 214 into the recess 10 on the cam disk 212, while the fixed locking pawl 215 releases the movable locking pawl 217 and mechanical brake 219 is now actuated by action of the spring 220. This will have the effect that the train, in case it cannot be brought to complete standstill by electrical braking, will be automatically stopped, when travelling quite slowly, without necessitating the operator to throw the lever for the mechanical brake. As early as in the first braking position the auxiliary contact member 311 will have established connection between the contacts 230 and 230'. At the moment when the operator intends to continue travel of the car, he presses the button 301 or 301' causing motion of the main switch D from braking position into position of travel, the contact member 233 establishing connection between the contacts 234 and 234'. Simultaneously therewith the coil 310 of the brake relay will be connected to ground by way of the contacts 230 and 230' which are now connected with each other. The auxiliary relay is now energized putting the two serially connected magnets 323 and 323' under tension against ground. Both magnets operate simultaneously, the magnet 211 carrying back the controller drum 221 against the action of the spring 201 almost instantaneously into zero position, while the magnet 323' attracts the brake mechanism 218 towards the left as shown in the drawings, until the locking pawl 215 may receive the pull of the spring 220 by a pressure exerted against the locking pawl 217.

The brake relay 227 will be automatically switched out of circuit in two cases, viz., when the brake drum has moved back into zero position thereby disconnecting the contacts 230 and 230' by means of the contact members 311, and when the mechanical brake is released which will interrupt the connection between 225 and 225' by means of the end contact after the brake has reached its end position.

The two leads from the relay 227 to ground and are connected in parallel relation by way of the contacts 230 and 230' and 225 and 225'. The remaining parts are in agreement with the diagram of connections shown in Fig. 1 which represents the basic features of my invention. The operation of the combined mechanical and electric braking system thus described may be briefly set forth as follows: Assuming it is desired to bring the train to rest by use of the electric or dynamic brake; the operator actuates the foot pedal 204 (see Fig. 16) to release the locking pawl 202, thus permitting the spring 201 to effect step by step movement of the brake controller drum E. This functions to manipulate the electrical connections between the resistance $g$—$f$ (see Fig. 1) and the driving motors M in a well known manner. If conditions are such that the train continues to coast slowly beyond the point where it is desired to stop, the mechanical brake may be readily brought into operation by further elevation of the pawl 202. Thus, assuming the pedal 204 has been previously operated to permit the drum E to advance nine steps or notches under the influence of the spring 201, a further elevation of the pawl 202 allows the drum to advance an additional step to the position in which the pawl 213 riding on the rim of disk 212 drops into a depression in said disk to thereby release locking pawls 215 and 217, at which time the spring 220 is effective to throw the brake shoe 219 forcibly against the wheel to bring the train quickly to a positive stop. When it is desired to resume travel the operator presses the button 235 or 235' which action energizes the actuating coil of the switch D to throw it to "travel" position. Simultaneously, the coils 211 and 223 are energized and these respectively return the drum E to zero position and withdraw the shoe 219 to release position against the opposition of spring 220.

In Fig. 15 I have shown diagrammatically but clearly the manner in which the hydraulic pressure units on the several cars are connected to the brake controller either directly as shown in Fig. 1 or through a servo-motor, it being noted that in Fig. 15 the several shafts 122 carrying the levers 155 are connected by suitable linkage indicated at L to the governing pawl 206.

A second improvement according to my invention consists in the following. As above stated, there had been exclusively the possibility of causing the brake drum to move into any desired position and to cause backward motion of said brake drum into zero position by depressing the travel button and simultaneously initiating therewith the operation of the drum of the main controller.

This arrangement, however, is not sufficient for all purposes, because it must be possible, for instance, if a train has to pass different gradients in succession, to solely release braking, either to let the car run freely or to cause the brake drum to move forward for a somewhat smaller distance than previously. In a case of this kind it may eventually be undesirable to have the main controller, even for a short time, connect the motors simultaneously to the circuit. In order to provide for this I have devised another mode of connections which is described more fully in the following, reference being made to the diagram given in Fig. 16. According to this diagram of connections, provision is made to operate one car as well as trains composed of several car units at any desired velocity of travel, for instance, for switching operations.

It is to be noted that the diagram of connections given in Fig. 16 is a general representation of my new brake system of a street car for travel in two directions. Accordingly the car is equipped with two operator's stands. All main connections have been omitted and the diagram shows solely the arrangement of the auxiliary connections.

The right-hand operator's stand is designated with T. At this operator's stand there is mounted the main controller as well as the travel reversing controller F. At the left-hand operator's stand which is designated with T' there is mounted the travel reversing controller F' as well as the brake controller E. A pedal for actuating the brake is shown solely at the operator's stand T' for the sake of simplicity, while as a matter of course a like pedal must be provided at the operator's stand T. The main switch D is positioned in the center of the drawings. In other respects the arrangement is essentially identical with that just described in connection with the aforementioned first improvement.

301 and 301' represent the switching instrumentalities which serve for operating the control system. 302 and 302' are control buttons, the former serving for purposes of switching, the latter serving to stop the car.

Fig. 17 shows a preferred form of construction in which the switch 301 is united with the pressure button 302 as well as a preferred form of mechanical drive for the brake drum.

It is assumed that the car be in condition of travel and that the operator has actuated the brake controller to any desired position thereof by depression of the pedal. If the operator who is positioned at the stand T now intends to have the car run out freely, he will have to depress the lever 301 to an extent to contact with the contact member 303, thus establishing connection between the overhead conductor 304 through connection 305, branch point 306, connection 307, lever 301, contact member 303, connector 308, branch point 309, brake relay 310, contact member 311 on the brake drum and connection 312 towards ground. The brake relay will consequently be energized and the armature 319 of said relay will establish a circuit from overhead conductor 304, by way of the connection 305, contact 320, contacts 321, 322, magnets 323, 323' towards ground. The relay therefore will energize the magnets 323 and 323' which release the spring-actuated brake and move the brake drum back into zero position. At the same time the armature 319 of the relay has established connection between the contact 320 and 321, said relay energizing itself backward by way of the connection 324 towards the branch point 325. An instantaneous contact between the switch 301 and the contact member 303 will therefore be sufficient to safely release the spring-actuated brake and to move back the brake drum into zero position. The brake relay 310 will switch itself out of circuit after the contact member 311 is in zero position and after the brake drum has been carried back and the spring-actuated brake released. A connection 342 is branched off the connection 308 at the point 341, said connection 342 in position of "forward travel" of the travel reversing controller F connecting the lead N to line. In this manner current will be supplied to the subsequent motor car in such a manner that, if the operator releases the brake or moves back the brake drum into zero position, this operation will take place simultaneously in all motor cars of the train.

For this purpose the travel reversing controller on each front platform must be properly adjusted before starting the train. If the train travels backward for some short distance, it will be sufficient to adjust the front travel reversing controller of the motor car at the head of the train into position for backward travel. The motors of this car will now operate alone since the reversing controller in position of backward travel will keep interrupted the connections supplying the control current to the subsequent cars. If it is desired to reverse the entire train, all reversing controllers in the several cars must be reversed, such as is at present the case. If such reversing had been inadvertently omitted in one car of the train, this car will not operate as motor car.

If it is desired to continue travel, the operator throws the switch 301 into some lower position so that it will make in addition to contact member 303 a contact with member 326. The train will now start in well known manner, and the main controller after having reached full series position will remain at standstill. If it is desired to have the main controller move as far as to its end position, the switch must be further thrown so that there will only remain a connection between the contacts 301 and 326. This means a lower position of the rotary switch according to Fig. 16 and a simple further motion of the lever switch according to Fig. 17.

If it is desired for some reason, for instance for purposes of switching, that a car or an entire train of cars be given a slow motion, the operator will have to depress the button 302 at the operator's stand T. Thus the line voltage will be transmitted by way of the connection 305, branch point 306, connection 307, branch point 327, contact 328 to the contacts 329 and 330. The contact 329 now connects the line voltage in known manner with the control relay 88 which causes motion of the main controller. At the same time, the line voltage will be transmitted from contact 328 to contact 330 and from the latter by way of the connection 331 to the electro-magnetically actuated locking mechanism SP, which retains the main controller in its first position and prevents further motion of said controller. The locking mechanism SP is the same as that which by contact between the contact member 332 and the contact fingers 333 and 334 arrests switching motion of the main controller, after the latter has arrived at its full series position. Simultaneously with depressing the button 302 which serves for switching operations, the connection 335 which otherwise actuates the control relay SS will be interrupted at the point 336, that is to say, the line voltage will not be transmitted to the through-connection M and therewith also be prevented against being transmitted to the subsequent cars. Depression of the button 302, therefore, solely causes operation of the main controller of that car in which the operator is positioned, the main controller being moved as far as to the first operating position.

For some purposes, such as, for switching on gradients the first operating position will not be sufficient to set the entire train into motion. On the other hand, however, in case of very dense traffic it may be desirable to choose the velocity of travel intermediate the zero position and full series position or intermediate the full series position and full parallel position. In such a case, the operator, as usual, throws the lever 301 and depresses the button 302 as soon as the desired velocity has been attained which may be done in any position of the main controller. Now, the locking mechanism SP will at once operate in the above described manner, said locking mechanism retaining the main controller of the front motor car in the position just arrived at. By interrupting the connection 335 at 336, the main controllers of the subsequent motor car will at once be disconnected and return into zero position. It will therefore be practically possible to operate the train at any desired velocity of travel and to also maintain this velocity.

According to the second improvement of my invention, the main controller is locked, while the brake controller has returned into zero position, the main controller operating only after the brake controller has returned to zero position. Practically this will be instantaneously the case because of the action of strong magnet 323. This mode of operation is accomplished by carrying the connection 338 past a contact 339 of the brake drum which disconnects the latter in every position different from zero position.

The switch 337 which is inserted in the connection 335 has for its purpose to permit, in inoperative condition of the main controller of a subsequent car, to disconnect this car alone, while it will further be possible to actuate the hand-brake in any car by the oil pressure conduit G which passes through the car as well as to release said hand-brake by connecting the conduit N to the line voltage.

The auxiliary contact device of the reversing controllers F and F' comprises two contacts 340 and 340' which in case of backward travel with only the motors of the front car operative will likewise permit, as known, actuation and release of all brakes in the several motor cars of the train.

Fig. 17 represents a lever switch which serves simultaneously for electrical operation of the main controller and for mechanical operation of the brake controller. In Fig. 17 the direction of travel is supposed to be towards the right. The operator would therefore have to be positioned in the rear of the brake lever at the left-hand side thereof with his face directed towards the right. The lever SH is normally in zero position. If the operator desires to have the main controller move into series position and as far as to parallel position, he will have to throw the lever SH shown in Fig. 17 towards the right, that is towards the front, either into the position N which represents full series connection or into the position M which represents full parallel connection. As soon as the operator releases the lever SH, the latter is automatically carried back into zero position by means of a spring not shown in the drawings.

In order to brake the train the operator will have to throw the lever SH towards the left in the drawings, that is towards the rear in the direction of travel of the car or in direction towards himself. The lever after moving beyond the position BL which is explained herein further below, will now press with a rectangular extension fixed on said lever against the extension V of the piston KO, thus moving the latter in downward direction. The brake controller is now operated in well known manner by displacement of a liquid. The brake controller remains inserted in the circuit as long as the operator keeps the lever in any of its braking positions. Further backward throwing of the lever to the left will have the effect of operating the brake controller in further positions thereof, while releasing the lever will cause the brake drum to remain in the position at a time arrived at. The brake will be released as soon as the operator carries the lever back by hand into the position BL or into zero position, or if the operator releases said lever so that it will move back into zero position by action of a spring (not shown in the drawings). Release of the brake, in particular, is effected by said lever which closes the contacts for the position BL, even in case the time of closing said contacts is very short.

At the upper end of the lever there is mounted the button KN which serves for switching purposes and for stopping the train. If said button in zero position of the switch is depressed, it will open the contacts at I and close the contacts at II, with the result that the main controller of the first car will be caused to operate until it has arrived at its first operating position in the above described manner. If the button KN, however, is depressed in one of the travel positions of the switch, the main controller of the front motor car will remain in the position reached, while the main controller of the subsequent motor cars will at once be disconnected. The details of this operation had been above described.

A further improvement of the present invention is that of the Sand discharging apparatus set forth in my copending and divisional application Serial No. 715,893, filed March 16, 1934.

I claim:

1. Apparatus of the kind described, including a main controller, and electrically governed brake control means and a main switch in circuit with the main controller and adapted to effect operation of the brake control means independently of the temporary position of the main controller.

2. Apparatus of the kind described, including a brake controller, spring means tending to impart a switch-in movement to said brake controller, electro-magnetic control means operating against the force of said spring means for switching-out said brake controller and means releasable by said electro-magnetic means for latching the controller in positions to which it is moved by the spring means, said electro-magnetic control means when energized adapted to permit disconnection of said latching means for the brake controller and tensioning of said spring simultaneously therewith.

3. Apparatus of the kind described, including a spring-actuated brake controller, a pressure oil conduit for operating said brake controller, a locking pawl associated with a spirally shaped cam-disk adapted to permit forward motion of said brake controller in agreement with the displacement of oil in said pressure oil conduit and to simultaneously prevent standstill of said brake controller intermediate two operating steps.

4. Apparatus of the kind described, including a spring-actuated brake controller, a fluid pressure actuated means for operating said brake controller, a locking pawl associated with a spirally shaped cam-disk adapted to permit forward motion of said brake controller in response to operation of said fluid pressure actuated means and to simultaneously prevent standstill of said brake controller intermediate two operating steps, a mechanical braking means, and automatic control apparatus permitting actuation of said mechanical braking means simultaneously with the operation of said fluid pressure actuated means and said brake controller.

5. Apparatus of the kind described, including mechanical braking instrumentalities, electromagnetic control apparatus for releasing said mechanical braking instrumentalities, additional mechanical retention means for retaining said mechanical braking instrumentalities in released condition, and automatic means for releasing said additional mechanical retention means in said released condition of said mechanical braking instrumentalities.

6. In apparatus of the kind described, a plurality of vehicle control units, and separate actuating means for each unit, means automatically responsive to operation of the actuating means for each of said units for effecting operation of another of said units, and additional means associated with each unit for effectively operating said unit mechanically and independently of such automatic operation of the unit.

7. In apparatus of the kind described, a plurality of vehicle control units each having hydraulic pressure operated actuating means therefor, means responsive to the operation of the actuating means of one of said units to control the pressure operation of the actuating means of another of said units and additional means associated with each unit for effectively operating said unit independently of the hydraulic pressure operation of said actuating means.

8. In apparatus of the kind described, a plurality of vehicle control units each having hydraulic pressure operated actuating means therefor, means responsive to the operation of the actuating means of one of said units to control the pressure operation of the actuating means of another of said units, and additional means associated with each unit for effectively operating said unit independently of the hydraulic pressure operation of said actuating means, said additional means and the actuating means having coacting parts locking said additional means against operation when the actuating means is operated by hydraulic pressure.

9. In apparatus of the kind described, a plurality of vehicle control units each having hydraulic pressure operated actuating means therefor, means responsive to operation of the actuating means of one of said units to control the pressure operation of the actuating means of another of said units, each of said units including an energy receiving and transmitting shaft, and the actuating means comprising piston means cooperating with means on said shaft and movable axially in either direction under hydraulic pressure to rotate said shaft in one direction.

10. In apparatus of the kind described, a plurality of vehicle control units each having hydraulic pressure operated actuating means therefor, means responsive to operation of the actuating means of one of said units to control the pressure operation of the actuating means of another of said units, each of said units including an energy receiving and transmitting shaft, and the actuating means comprising piston means cooperating with means on said shaft and movable axially in either direction under hydraulic pressure to rotate said shaft in one direction, and spring means acting to rotate said shaft in the opposite direction and return the piston means to normal position.

11. In apparatus of the kind described, a plurality of vehicle control units each having hydraulic pressure operated actuating means therefor, means responsive to operation of the actuating means of one of said units to control the pressure operation of the actuating means of another of said units, each of said units including an energy receiving and transmitting shaft, and the actuating means comprising pistons each cooperating with means on said shaft in the unitary axial movement of said pistons in either direction under hydraulic pressure to rotate said shaft in one direction, and an additional rotatable member cooperating with said pistons to relatively move the same in opposite axial directions to rotate said shaft and simultaneously position said pistons to effect the hydraulic pressure operation of the actuating means of other control units.

12. In apparatus of the kind described, a plurality of vehicle control units each having hydraulic pressure operated actuating means therefor, means responsive to operation of the actuating means of one of said units to control the pressure operation of the actuating means of another of said units, each of said units including an energy receiving and transmitting shaft, and the actuating means comprising pistons each cooperating with means on said shaft in the unitary axial movement of said pistons in either direction under hydraulic pressure to rotate said shaft in one direction, an additional rotatable member cooperating with said pistons to relatively move the same in opposite axial directions to rotate said shaft and simultaneously position said pistons to effect the hydraulic pressure operation of the actuating means of other control units, and said rotatable member having parts coacting with the respective pistons when the latter are moved as a unit in either direction to lock said member against operation.

13. In apparatus of the kind described, a plurality of vehicle control units each having hydraulic pressure operated actuating means therefor, means responsive to operation of the actuating means of one of said units to control the pressure operation of the actuating means of another of said units, each of said units including an energy receiving and transmitting shaft, and the actuating means comprising pistons each cooperating with means on said shaft in the unitary axial movement of said pistons in either direction under hydraulic pressure to rotate said shaft in one direction, an additional rotatable member cooperating with said pistons to relatively move the same in opposite axial directions to rotate said shaft and simultaneously position said pistons to effect the hydraulic pressure operation of the actuating means of other control units, and additional hydraulic pressure operated means associated with each unit and operatively connected with said rotatable member to actuate the latter.

14. In combination with a plurality of vehicles, a brake operating unit on each vehicle, hydraulic pressure operated actuating means for said units individual to the respective vehicles, and means rendered effective by the operation of the actuating means for any one unit to cause the hydraulic pressure operation of the actuating means for the brake operating units of the other vehicles and means associated with each unit for mechanically actuating said unit and hydraulically actuating the units of the other vehicles.

15. In combination with a plurality of vehicles, a brake operating unit on each vehicle, hydraulic pressure operated actuating means for said units individual to the respective vehicles, and means rendered effective by the operation of the actuating means for any one unit to cause the hydraulic pressure operation of the actuating means for the brake operating units of the other vehicles, said last named means including aligned coacting pistons on the adjacent vehicles operated in one direction by the hydraulic operating medium for the brake applying units of the respective vehicles when either of said units is operated to thereby effect the hydraulic pressure operation of the brake applying unit of the other vehicle.

16. In an electrically propelled vehicle, a driving motor therefor and circuit connections for electrically braking the movement of said vehicle by said motor including a brake controller, and fluid pressure means for controlling operation of the brake controller.

17. In an electrically propelled vehicle, a driving motor therefor and circuit connections for electrically braking the movement of said vehicle by said motor including a brake controller, fluid pressure means for controlling operation of the brake controller, said fluid pressure means comprising an element movable in response to fluid pressure within said fluid pressure means, means for manually developing a pressure within said fluid pressure means effective to move said element, and means operatively connecting said element and said brake controller.

18. In an electrically propelled vehicle, a driving motor therefor and circuit connections for electrically braking the movement of said vehicle by said motor including a brake controller, fluid pressure means for controlling operation of the brake controller including a servo-motor operatively connected to the brake controller and tending to move the same into braking position, latching means for holding the controller against such movement, and means responsive to pressure developed in said fluid pressure means and effective to release said latching means to permit operation of the controller by the servo-motor.

19. In a train of electrically propelled vehicles each having a driving motor, circuit connections for electrically braking said vehicles through said motors and including a brake controller for each vehicle, and fluid pressure means for actuating said brake controllers in unison from any one of the vehicles.

20. In a train of electrically propelled vehicles each having a driving motor, circuit connections for electrically braking said vehicles through said motors and including a brake controller for each vehicle, fluid pressure means for actuating said brake controllers in unison from any one of the vehicles, said fluid pressure means including a fluid pressure conduit common to all of said vehicles, operative connections between said conduit and the several brake controllers, and means on each vehicle for developing an effective fluid pressure throughout said conduit for simultaneously operating all of said controllers.

21. In an electrically propelled vehicle, a driving motor therefor, circuit connections for electrically braking the vehicle through said motor, a brake controller for regulating the brake effort of the motor, mechanical braking means for the vehicle, and unitary means for successively applying electric and mechanical braking effort to the vehicle.

22. In an electrically propelled vehicle, a driving motor therefor, circuit connections for electrically braking the vehicle through said motor, a brake controller for regulating the brake effort of the motor, mechanical braking means for the vehicle, and means for selectively braking the vehicle either electrically or mechanically at will.

23. In a brake control system for electrically propelled vehicles each including a driving motor, a main controller for energizing the driving motors, circuit connections for electrically braking the vehicle through the driving motors and including a brake controller and circuit connections between the brake controller and main controller whereby the main controller is energized beyond a predetermined advanced position only when the brake controller is in zero position.

LOUIS EUGÈNE-WILDOLT
MONTROSE-OSTER.